United States Patent
Yoneda et al.

(10) Patent No.: US 10,266,033 B2
(45) Date of Patent: Apr. 23, 2019

(54) METHOD FOR ESTIMATING THERMAL SENSATION, THERMAL SENSATION ESTIMATION APPARATUS, AIR CONDITIONER, AND RECORDING MEDIUM

(71) Applicant: Panasonic Corporation, Osaka (JP)

(72) Inventors: Aki Yoneda, Hyogo (JP); Koichi Kusukame, Nara (JP); Hiroko Kubo, Nara (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/626,392

(22) Filed: Jun. 19, 2017

(65) Prior Publication Data

US 2017/0368907 A1 Dec. 28, 2017

(30) Foreign Application Priority Data

Jun. 24, 2016 (JP) .................................. 2016-125943
Dec. 15, 2016 (JP) .................................. 2016-243151

(51) Int. Cl.
*B60H 1/00* (2006.01)
*G01J 5/00* (2006.01)
*G06K 9/20* (2006.01)
*G06K 9/00* (2006.01)
*G01J 5/02* (2006.01)

(52) U.S. Cl.
CPC ........ *B60H 1/00742* (2013.01); *G01J 5/0025* (2013.01); *G01J 5/026* (2013.01); *G06K 9/00845* (2013.01); *G06K 9/2018* (2013.01); *G01J 2005/0077* (2013.01)

(58) Field of Classification Search
CPC ............. F24F 11/0034; B60H 1/00742; B60H 1/00985; G06F 3/0488; G06F 3/01; G01J 5/0025; G01J 2005/0077; G06K 9/2018; B60W 40/08; B60W 2040/0881
USPC .......................................................... 165/202
See application file for complete search history.

(56) References Cited

U.S. PATENT DOCUMENTS

2015/0028114 A1\* 1/2015 Rosen .................. F24F 11/0034
236/51
2015/0105976 A1\* 4/2015 Shikii ................... G06F 3/0488
701/36

FOREIGN PATENT DOCUMENTS

WO 2015/122201 8/2015

\* cited by examiner

*Primary Examiner* — Davis D Hwu
(74) *Attorney, Agent, or Firm* — Greenblum & Bernstein, P.L.C.

(57) ABSTRACT

In a method for estimating thermal sensation, thermal environment information at least regarding a thermal environment of or around a person is obtained, (1) a method for estimating a first thermal sensation, (2) a method for estimating a second thermal sensation, or (3) both the method for estimating the first thermal sensation and the method for estimating the second thermal sensation is selected as a method for estimating thermal sensation, which indicates a degree of warmth or coldness of the person, on the basis of the thermal environment information, and the thermal sensation is estimated using the selected method.

20 Claims, 7 Drawing Sheets

METHOD FOR ESTIMATING THERMAL SENSATION, THERMAL SENSATION ESTIMATION APPARATUS, AIR CONDITIONER, AND RECORDING MEDIUM

BACKGROUND

1. Technical Field

The present disclosure relates to a method for estimating thermal sensation, a thermal sensation estimation apparatus, an air conditioner, and a recording medium.

2. Description of the Related Art

A thermal sensation estimation apparatus that estimates thermal sensation, which indicates a degree of warmth or coldness of a person, without a report from the person is known. When the thermal sensation estimation apparatus is installed in an automobile, for example, an automotive air conditioner can be efficiently operated by controlling the air temperature of the automotive air conditioner or the like on the basis of the estimated thermal sensation.

One of thermal sensation estimation apparatuses in examples of the related art is one that estimates thermal sensation by measuring an average skin temperature of a person on the basis of a fact that the average skin temperature and the thermal sensation have a high correlation. When this kind of thermal sensation estimation apparatus is used, however, a temperature sensor needs to be directly attached to a person's skin, which is not practical.

In order to solve the above problem, a thermal sensation estimation apparatus that focuses upon the amount of heat lost from a person's skin through clothes has been proposed (e.g., refer to International Publication No. 2015/122201). The thermal sensation estimation apparatus according to International Publication No. 2015/122201 calculates the amount of heat lost from a person on the basis of a difference between a human body surface temperature measured by a thermal camera and an atmospheric temperature (air temperature) and estimates thermal sensation on the basis of the calculated amount of heat lost from the person.

SUMMARY

In one general aspect, the techniques disclosed here feature a method used by a thermal sensation estimation apparatus that estimates thermal sensation, which indicates a degree of warmth or coldness of a person. The method includes obtaining thermal environment information at least regarding a thermal environment of or around a person, selecting (1) a method for estimating a first thermal sensation, (2) a method for estimating a second thermal sensation, or (3) both the method for estimating the first thermal sensation and the method for estimating the second thermal sensation as the method for estimating thermal sensation, which indicates a degree of warmth or coldness of the person, on the basis of the thermal environment information, and estimating the thermal sensation using the selected method.

With the method for estimating thermal sensation according to the aspect of the present disclosure, thermal sensation can be accurately estimated in accordance with a thermal environment.

It should be noted that general or specific aspects may be implemented as a system, a method, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of Present Disclosure

A method for estimating thermal sensation used by a thermal sensation estimation apparatus according to International Publication No. 2015/122201 presupposes that the amount of heat lost from a person and the person's thermal sensation have a high correlation. The person's thermal sensation, however, does not always changes in accordance with the amount of heat lost from the person. In a thermal environment in which the amount of heat lost from the person and the person's thermal sensation do not have a correlation, it is difficult to accurately estimate the person's thermal sensation.

In addition, in the method for estimating thermal sensation used by the thermal sensation apparatus according to International Publication No. 2015/122201, the amount of heat lost from a person's skin through clothes is calculated by measuring a temperature of a surface of the clothes using a thermal camera. Depending on a state of the surface of the clothes, however, the calculated amount of heat lost might include a large error, and thermal sensation is not accurately estimated.

The present disclosure, therefore, provides a method for estimating thermal sensation, a thermal sensation estimation apparatus, an air conditioner, and a recording medium capable of accurately estimating thermal sensation in accordance with a thermal environment.

A method for estimating thermal sensation according to an aspect of the present disclosure is a method used by a thermal sensation estimation apparatus. The method includes obtaining thermal environment information at least regarding a thermal environment of or around a person, selecting (1) a method for estimating a first thermal sensation, (2) a method for estimating a second thermal sensation, or (3) both the method for estimating the first thermal sensation and the method for estimating the second thermal sensation as the method for estimating thermal sensation, which indicates a degree of warmth or coldness of the person, on the basis of the thermal environment information, and estimating the thermal sensation using the selected method.

According to this aspect, thermal sensation can be accurately estimated in accordance with a thermal environment by estimating the thermal sensation using the method for estimating the first thermal sensation and/or the method for estimating the second thermal sensation selected in accordance with the thermal environment.

For example, the method for estimating the first thermal sensation may be a method for estimating thermal sensation based on an amount of heat lost from the person. The method for estimating the second thermal sensation may be a method for estimating thermal sensation based on a surface temperature of the person.

According to this aspect, the method for estimating the first thermal sensation based on the amount of heat lost from a person and/or the method for estimating the second thermal sensation based on a surface temperature of a person can be selected in accordance with a thermal environment. As a result, thermal sensation can be accurately estimated in accordance with the thermal environment.

For example, the thermal environment information may be a difference between a temperature outside a room in which the person stays and a temperature inside the room.

According to this aspect, a difference between a temperature outside a room and a temperature inside the room can be used as thermal environment information.

For example, the method may further include determining whether the difference is equal to or larger than a first threshold and selecting, if the difference is equal to or larger than the first threshold, the method for estimating the second thermal sensation until a certain period of time elapses after the person enters the room and then selecting the method for estimating the first thermal sensation when the certain period of time elapses.

According to this aspect, if the difference is equal to or larger than the first threshold, the amount of heat lost from a surface of clothes is not equal to the amount of heat lost from skin in a thermal environment until a certain period of time elapses after a person enters a room, and the method for estimating the second thermal sensation is selected. If the difference is equal to or larger than the first threshold, the amount of heat lost from the skin is equal to the amount of heat lost from the surface of the clothes in the thermal environment after the certain period of time elapses, and the method for estimating the first thermal sensation is selected. As a result, thermal sensation can be accurately estimated in accordance with a thermal environment.

For example, the method may further include determining whether the difference is equal to or larger than a first threshold, further determining, if the difference is equal to or larger than the first threshold, whether a difference between the surface temperature of the person and the temperature inside the room is equal to or larger than a second threshold, and selecting, if the difference between the surface temperature of the person and the temperature inside the room is equal to or larger than the second threshold, the method for estimating the second thermal sensation or selecting, if the difference between the surface temperature of the person and the temperature inside the room is smaller than the second threshold, the method for estimating the first thermal sensation.

According to this aspect, if the difference is equal to or larger than the first threshold and a difference between a surface temperature of a person and a temperature inside a room is equal to or larger than the second threshold, the amount of heat lost from a surface of clothes is not equal to the amount of heat lost from skin in a thermal environment, and the method for estimating the second thermal sensation is selected. If the difference is equal to or larger than the first threshold and the difference between the surface temperature of the person and the temperature inside the room is smaller than the second threshold, the amount of heat lost from the surface of the clothes is equal to the amount of heat lost from the skin in the thermal environment, and the method for estimating the first thermal sensation is selected. As a result, thermal sensation can be accurately estimated in accordance with a thermal environment.

For example, the thermal environment information may be a surface temperature of the person's feet. Whether the surface temperature of the person's feet is equal to or higher than a third threshold may be determined. If the surface temperature of the person's feet is equal to or higher than the third threshold, the method for estimating the first thermal sensation is selected, and if the surface temperature of the person's feet is lower than the third threshold, the method for estimating the second thermal sensation may be selected.

According to this aspect, if a surface temperature of feet is equal to or higher than the third threshold, thermal sensation according to the amount of heat lost from a person is obtained, and the method for estimating the first thermal sensation is selected. If the surface temperature of the feet is lower than the third threshold, thermal sensation according to the amount of heat lost from the person is not obtained, and the method for estimating the second thermal sensation is selected. As a result, thermal sensation can be estimated in accordance with a thermal sensation.

For example, the thermal environment information may be a temperature around the person's feet. Whether the temperature around the person's feet is equal to or higher than a fourth threshold may be determined. If the temperature around the person's feet is equal to or higher than the fourth threshold, the method for estimating the first thermal sensation may be selected, and if the temperature around the person's feet is lower than the fourth threshold, the method for estimating the second thermal sensation may be selected.

According to this aspect, if a temperature around feet is equal to or higher than the fourth threshold, thermal sensation according to the amount of heat lost from a person is obtained, and the method for estimating the first thermal sensation is selected. If the temperature around the feet is lower than the fourth threshold, thermal sensation according to the amount of heat lost from the person is not obtained, and the method for estimating the second thermal sensation is selected. As a result, thermal sensation can be accurately estimated in accordance with a thermal environment.

For example, the thermal environment information may be a surface temperature of the person's hands. Whether the surface temperature of the person's hands is equal to or higher than a fifth threshold may be determined. If the surface temperature of the person's hands is equal to or higher than the fifth threshold, the method for estimating the first thermal sensation may be selected, and if the surface temperature of the person's hands is lower than the fifth threshold, the method for estimating the second thermal sensation may be selected.

According to this aspect, if a surface temperature of hands is equal to or higher than the fifth threshold, thermal sensation according to the amount of heat lost from a person is obtained, and the method for estimating the first thermal sensation is selected. If the surface temperature of the hands is lower than the fifth threshold, thermal sensation according to the amount of heat lost from the person is not obtained, and the method for estimating the second thermal sensation is selected. As a result, thermal sensation can be accurately estimated in accordance with a thermal environment.

For example, the method for estimating the first thermal sensation may be performed by calculating a difference between a surface temperature of a human body area, which at least includes a part of the person's body exposed and a part of the person's clothes, and a temperature around the person, calculating an amount of heat lost from the person by multiplying the difference by a certain value, and estimating the thermal sensation on the basis of the amount of heat lost from the person.

According to this aspect, thermal sensation can be easily estimated on the basis of the amount of heat lost from a person.

For example, the surface temperature of the human body area may be calculated using a thermal image of an area including the person captured by a thermal camera.

According to this aspect, a surface temperature of a human body area can be easily calculated using a thermal image.

For example, the method for estimating the second thermal sensation may be performed by obtaining a surface temperature of a human body area, which at least includes a part of the person's body exposed and a part of the person's clothes, and estimating the thermal sensation on the basis of a result of a comparison between the surface temperature of the human body area and a sixth threshold.

According to this aspect, thermal sensation can be easily estimated on the basis of a surface temperature of a person.

For example, the surface temperature of the human body area may be calculated using a thermal image of an area including the person captured by a thermal camera.

According to this aspect, a surface temperature of a human body area can be easily calculated using a thermal image.

For example, the person may be inside a vehicle, and the thermal environment around the person may be at least either an outside or an inside of the vehicle.

According to this aspect, in a thermal environment in which a person is inside a vehicle, for example, thermal sensation can be accurately estimated.

For example, the estimation of the thermal sensation using both the method for estimating the first thermal sensation and the method for estimating the second thermal sensation may be performed by weight-averaging a result of estimation of thermal sensation by the method for estimating the first thermal sensation and a result of estimation of thermal sensation by the method for estimating the second thermal sensation using a certain value.

According to this aspect, thermal sensation can be estimated more accurately.

For example, instruction information for controlling air volume, air temperature, or wind direction of an air conditioner may be output to the air conditioner on the basis of the estimated thermal sensation.

According to this aspect, the air conditioner can be controlled such that, for example, thermal sensation becomes close to a neutral value. As a result, the air conditioner does not cool or heat too much, and power is saved.

A thermal sensation estimation apparatus according to an aspect of the present disclosure includes a processor and a memory that stores a computer program. The program causes the processor to perform operations including: obtaining thermal environment information at least regarding a thermal environment of or around a person; selecting (1) a method for estimating a first thermal sensation, (2) a method for estimating a second thermal sensation, or (3) both the method for estimating the first thermal sensation and the method for estimating the second thermal sensation as the method for estimating thermal sensation, which indicates a degree of warmth or coldness of the person, on the basis of the thermal environment information; and estimating the thermal sensation using the selected method.

According to this aspect, thermal sensation can be accurately estimated in accordance with a thermal environment by estimating the thermal sensation using the method for estimating the first thermal sensation and/or the method for estimating the second thermal sensation selected in accordance with the thermal environment.

An air conditioner according to an aspect of the present disclosure includes the thermal sensation estimation apparatus. Air volume, air temperature, or wind direction is controlled on the basis of thermal sensation estimated by the thermal sensation estimation apparatus.

According to this aspect, the air conditioner can be controlled such that, for example, thermal sensation becomes close to a neutral value. As a result, the air conditioner does not cool or heat too much, and power is saved.

A non-transitory recording medium according to an aspect of the present disclosure is a non-transitory recording medium storing a program for causing a computer to function as a thermal sensation estimation apparatus. The program causes the computer to perform operations including obtaining thermal environment information at least regarding a thermal environment of or around a person, selecting (1) a method for estimating a first thermal sensation, (2) a method for estimating a second thermal sensation, or (3) both the method for estimating the first thermal sensation and the method for estimating the second thermal sensation as the method for estimating thermal sensation on the basis of the thermal environment information, and estimating thermal sensation, which indicates a degree of warmth or coldness of the person, using the selected method.

According to this aspect, thermal sensation can be accurately estimated in accordance with a thermal environment by estimating the thermal sensation using the method for estimating the first thermal sensation and/or the method for estimating the second thermal sensation selected in accordance with the thermal environment.

It should be noted that these general or specific aspects may be implemented as a system, a method, an integrated circuit, a computer program, a computer-readable recording medium such as a compact disc read-only memory (CD-ROM), or any selective combination thereof.

Embodiments will be specifically described hereinafter with reference to the drawings.

The following embodiments are general or specific examples. Values, shapes, materials, components, arrangement positions and connection modes of the components, steps, the order of the steps, and the like mentioned in the following embodiments are examples, and do not limit the present disclosure. Among the components described in the following embodiments, ones not described in the independent claims, which define broadest concepts, will be described as arbitrary components.

First Embodiment 1-1. Configuration of Thermal Sensation Estimation Apparatus

Figure 1:
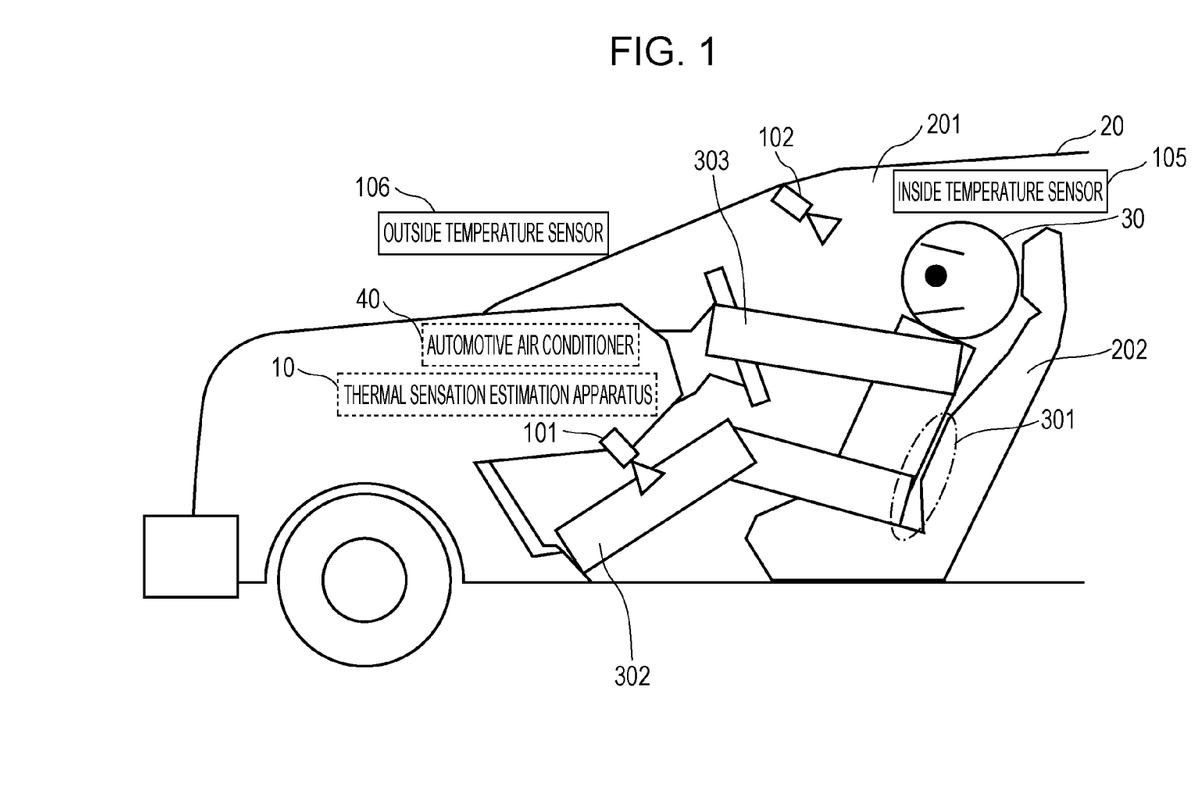
FIG. 1 is a diagram illustrating a use case of a thermal sensation estimation apparatus according to a first embodiment.
Figure 2:
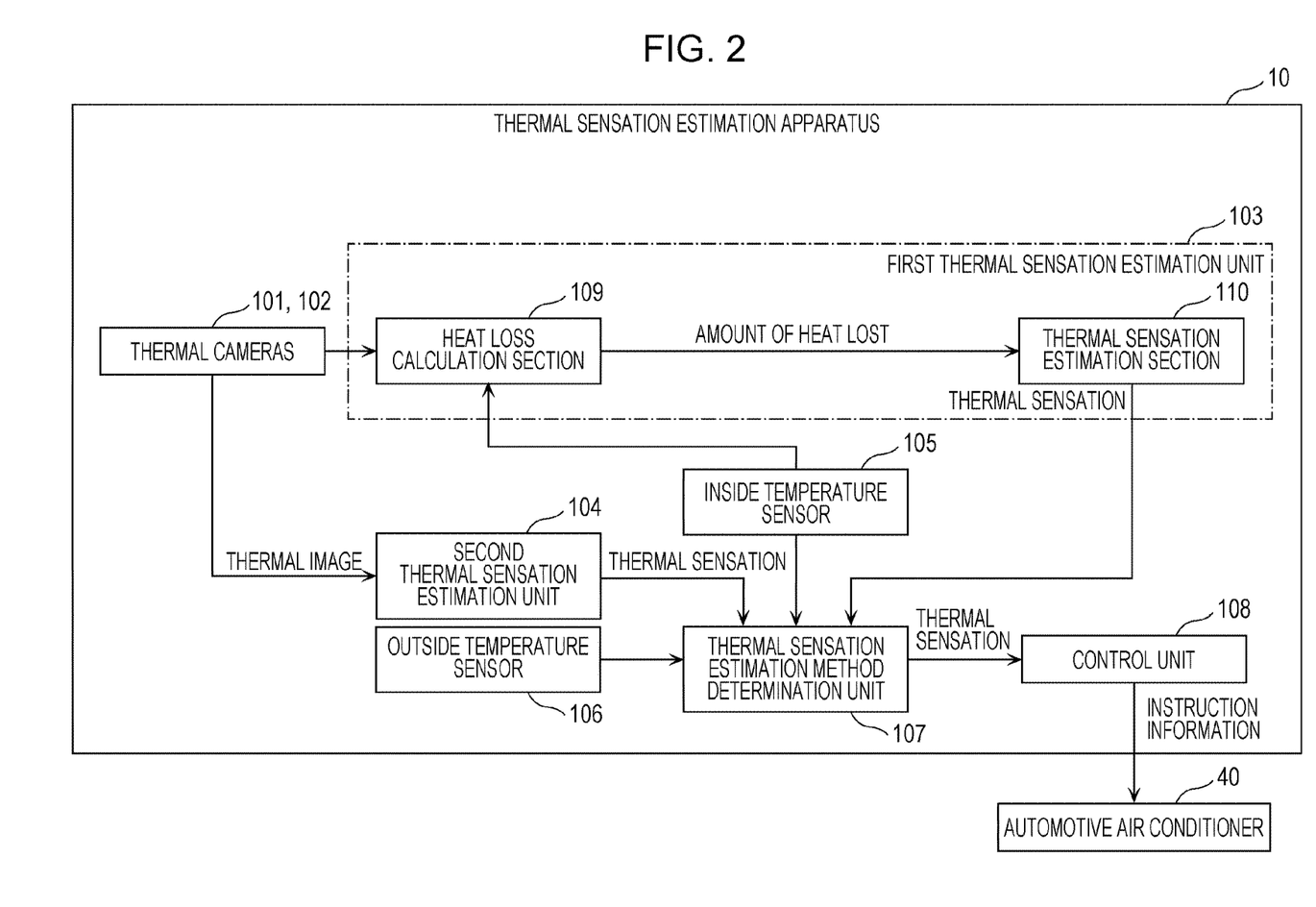
FIG. 2 is a block diagram illustrating the configuration of the thermal sensation estimation apparatus according to the first embodiment.

First, the configuration of a thermal sensation estimation apparatus 10 according to a first embodiment will be described with reference to FIGS. 1 and 2. FIG. 1 is a diagram illustrating a use case of the thermal sensation estimation apparatus 10 according to the first embodiment. FIG. 2 is a block diagram illustrating the configuration of the thermal sensation estimation apparatus 10 according to the first embodiment.

As illustrated in FIG. 1, for example, the thermal sensation estimation apparatus 10 is installed in an inside of a vehicle body 201 (an example of an inside of a room) of an automobile 20 (an example of a vehicle). When, in winter (or summer), a person 30 gets in the vehicle body 201 in which a heating operation (or a cooling operation) is being performed, for example, the thermal sensation estimation apparatus 10 estimates thermal sensation of the person 30 (a driver or the like) in a seat 202 of the automobile 20. As described later, the thermal sensation estimated by the thermal sensation estimation apparatus 10 is used to control air volume, air temperature, or wind direction of an automotive air conditioner 40.

As illustrated in FIG. 1, the automotive air conditioner 40 cools or heats the air inside the vehicle body 201 of the automobile 20. The automotive air conditioner 40 blows cold air to an upper half of a body of the person 30 in a cooling operation and blows warm air to the upper half of the body and feet of the person 30 in a heating operation.

As illustrated in FIGS. 1 and 2, the thermal sensation estimation apparatus 10 includes a first thermal camera 101, a second thermal camera 102, a first thermal sensation estimation unit 103, a second thermal sensation estimation unit 104, an inside temperature sensor 105, an outside temperature sensor 106, a thermal sensation estimation method determination unit 107, and a control unit 108.

The first thermal camera 101 and the second thermal camera 102 detect infrared light radiated from objects and obtain thermal images indicating thermal distribution in space. As illustrated in FIG. 1, the first thermal camera 101 is mounted on a dashboard of the vehicle body 201, for example, and captures a thermal image of a lower half of the body of the person 30 in the seat 202 from the front. The second thermal camera 102 is mounted on a rearview mirror of the vehicle body 201, for example, and captures a thermal image of the upper half of the body of the person 30 in the seat 202 from the front. The first thermal camera 101 and the second thermal camera 102 combine a thermal image of the lower half of the body of the person 30 and a thermal image of the upper half of the body of the person 30 captured from the front to obtain a thermal image of an area including the whole body of the person 30 viewed from the front.

The first thermal sensation estimation unit 103 estimates the thermal sensation of the person 30 using a method for estimating a first thermal sensation based on the amount of heat lost from the person 30. The first thermal sensation estimation unit 103 includes a heat loss calculation section 109 and a thermal sensation estimation section 110.

The heat loss calculation section 109 calculates the total amount of heat lost to an outside from the whole body of the person 30. In general, the person 30 loses heat to the outside through a) convection (includes conduction), b) radiation, and c) expiration and the evaporation of perspiration. Expiration and the evaporation of perspiration remain constant when the person 30 is at rest. The heat loss calculation section 109, therefore, calculates the amount of heat lost through convection (hereinafter referred to as the "amount of heat convected") and the amount of heat lost through radiation (hereinafter referred to as the "amount of heat radiated"), which are dominant factors in determining thermal sensation.

The amount of heat convected is the amount of heat lost through convection between air and the person 30. The amount of heat convected is calculated by multiplying a difference between an average surface temperature of the whole body of the person 30 in a human body area and a temperature inside the vehicle body 201 (an example of a temperature around a person) by a convective heat transfer coefficient (an example of a certain value). The human body area at least includes a part of the body of the person 30 exposed and a part of clothes of the person 30. The average surface temperature of the whole body of the person 30 is obtained from thermal images captured by the first thermal camera 101 and the second thermal camera 102. The temperature inside the vehicle body 201 is measured by the inside temperature sensor 105 installed in the vehicle body 201. As the temperature inside the vehicle body 201, an average temperature of a background image, which is a part of a thermal image other than the person 30, may be used. The convective heat transfer coefficient is a fixed value set in advance.

The amount of heat radiated is calculated by multiplying a difference between the average surface temperature of the whole body of the person 30 in the human body area and an average radiation temperature surrounding the person 30 by a radiative heat transfer coefficient. The average radiation temperature and the average surface temperature of the whole body of the person 30 are obtained from thermal images captured by the first thermal camera 101 and the second thermal camera 102. As the average radiation temperature, an average temperature in a background image, which is a part of a thermal image other than the person 30, may be used. Alternatively, the average radiation temperature may be obtained using a globe thermometer (not illustrated) installed in the vehicle body 201. The radiative heat transfer coefficient is a fixed value set in advance.

The heat loss calculation section 109 adds the amount of heat convected and the amount of heat radiated and then calculates the total amount of heat lost by multiplying a result of the addition by a certain area ratio. A specific calculation method used by the heat loss calculation section 109 will be described later.

The thermal sensation estimation section 110 estimates the thermal sensation (hereinafter referred to as a "first thermal sensation") of the person 30 on the basis of the total amount of heat lost calculated by the heat loss calculation section 109. A specific estimation method used by the thermal sensation estimation section 110 will be described later.

The second thermal sensation estimation unit 104 estimates the thermal sensation (hereinafter referred to as a "second thermal sensation") of the person 30 using a method for estimating a second thermal sensation based on a surface temperature of the person 30. More specifically, the second thermal sensation estimation unit 104 compares the average surface temperature of the whole body of the person 30 in the human body area with a sixth threshold. If the average surface temperature is lower than the sixth threshold, the second thermal sensation estimation unit 104 determines that the person 30 is feeling relatively cold, and if the average surface temperature is equal to or higher than the sixth threshold, the second thermal sensation estimation unit 104 determines that the person 30 is feeling relatively warm. The average surface temperature of the whole body of the person 30 is obtained from thermal images captured by the first thermal camera 101 and the second thermal camera 102. A known technique may be used for the method for estimating the second thermal sensation.

As a method for estimating thermal sensation to be used, the thermal sensation estimation method determination unit 107 selects either 1) the method for estimating the first thermal sensation or (2) the method for estimating the second thermal sensation on the basis of a difference (an example of thermal environment information regarding a thermal environment around the person 30) between the temperature inside the vehicle body 201 in which the person 30 stays and a temperature of an outside of the vehicle body 201 (an example of an outside of a room). The thermal sensation estimation method determination unit 107 transmits, to the control unit 108, thermal sensation (the first thermal sensation or the second thermal sensation) estimated by the selected method for estimating thermal sensation.

More specifically, if the difference is smaller than a first threshold, the thermal sensation estimation method determination unit 107 selects the method for estimating the first thermal sensation. If the difference is equal to or larger than the first threshold and a difference between the average surface temperature of the whole body of the person 30 in the human body area and the temperature inside the vehicle body 201 is smaller than a second threshold, the thermal sensation estimation method determination unit 107 selects the method for estimating the first thermal sensation. If the difference is equal or larger than the first threshold and the difference between the average surface temperature of the whole body of the person 30 in the human body area and the temperature inside the vehicle body 201 is equal to or larger than the second threshold, the thermal sensation estimation method determination unit 107 selects the method for estimating the second thermal sensation. The thermal sensation estimation method determination unit 107 transmits the first thermal sensation or the second thermal sensation to the control unit 108 depending on the selected method for estimating thermal sensation. The temperature inside the vehicle body 201 is measured by the inside temperature sensor 105, for example, installed in the vehicle body 201. The temperature outside the vehicle body 201 is measured by the outside temperature sensor 106, for example, installed outside the vehicle body 201.

A criterion used by the thermal sensation estimation method determination unit 107 to select a method for estimating thermal sensation will be described hereinafter. The person 30 loses heat to the outside from the skin through the clothes. At this time, if the clothes are in a steady heat conduction state, the amount of heat lost from a surface of the clothes can be seen as equal to the amount of heat lost to the outside from the skin. The amount of heat lost from the person 30, therefore, can be calculated by obtaining a difference between a temperature of the surface of the clothes and an atmospheric temperature (air temperature). If the amount of heat lost and the amount of heat produced (the amount of metabolism) are in balance, heat balance is maintained, and the person 30 can be estimated to be thermally neutral. If the amount of heat lost is larger than the amount of heat produced, on the other hand, it can be estimated that the person 30 is feeling relatively cold, and if the amount of heat lost is smaller than the amount of heat produced, it can be estimated that the person 30 is feeling relatively warm. The method for estimating the first thermal sensation based on the amount of heat lost from the person 30 is used therefore only when it is known that the amount of heat lost from the surface of the clothes is the same as the amount of heat lost from the skin. In other words, when it is known that the amount of heat lost from the surface of the clothes is the same the amount of heat lost from the skin, the method for estimating the first thermal sensation is effective, and the thermal sensation estimation method determination unit 107 selects the method for estimating the first thermal sensation.

On the other hand, when the person 30 who has stayed outside where temperature is 0° C. enters a vehicle whose inside temperature is 20° C., for example, the temperature of the surface of the clothes has become close to 0° C., and heat begins to transfer from the thermal environment whose temperature is 20° C. to the surface of the clothes whose temperature is 0° C. At this time, the amount of heat lost to the outside from the surface of the clothes is calculated as a negative value (heat is received), but the amount of heat lost from the skin to the surface of the clothes whose temperature is 0° C. is calculated as a positive value (heat is lost). That is, the amount of heat lost from the surface of the clothes and the amount of heat lost from the skin are completely different from each other. In this case, the method for estimating the first thermal sensation is not effective, and the thermal sensation estimation method determination unit 107 selects the method for estimating the second thermal sensation.

Since the thermal sensation of the person 30 depends on how the person 30 is dressed, an accuracy of estimating thermal sensation achieved by the method for estimating the second thermal sensation is not higher than an accuracy of estimating thermal sensation achieved by the method for estimating the first thermal sensation. As described above, however, when the amount of heat lost from the surface of the clothes is not the same as the amount of heat lost from the skin, the method for estimating the second thermal sensation reflects an actual thermal sensation more than the method for estimating the first thermal sensation.

The control unit 108 transmits (outputs), to the automotive air conditioner 40, instruction information for controlling at least one of the air volume, the air temperature, and the wind direction of the automotive air conditioner 40 on the basis of a thermal sensation (the first thermal sensation or the second thermal sensation) transmitted from the thermal sensation estimation method determination unit 107.

Some or all of the first thermal sensation estimation unit 103, the second thermal sensation estimation unit 104, and the thermal sensation estimation method determination unit 107 may be achieved as software by a processor (not illustrated), which is included in the thermal sensation estimation apparatus 10, that executes a program, or may be achieved as hardware by a dedicated circuit. Information used by the above components for their respective processes is stored in a memory (not illustrated) or a storage (not illustrated) included in the thermal sensation estimation apparatus 10.

1-2. Operation of Thermal Sensation Estimation Apparatus

Figure 3:
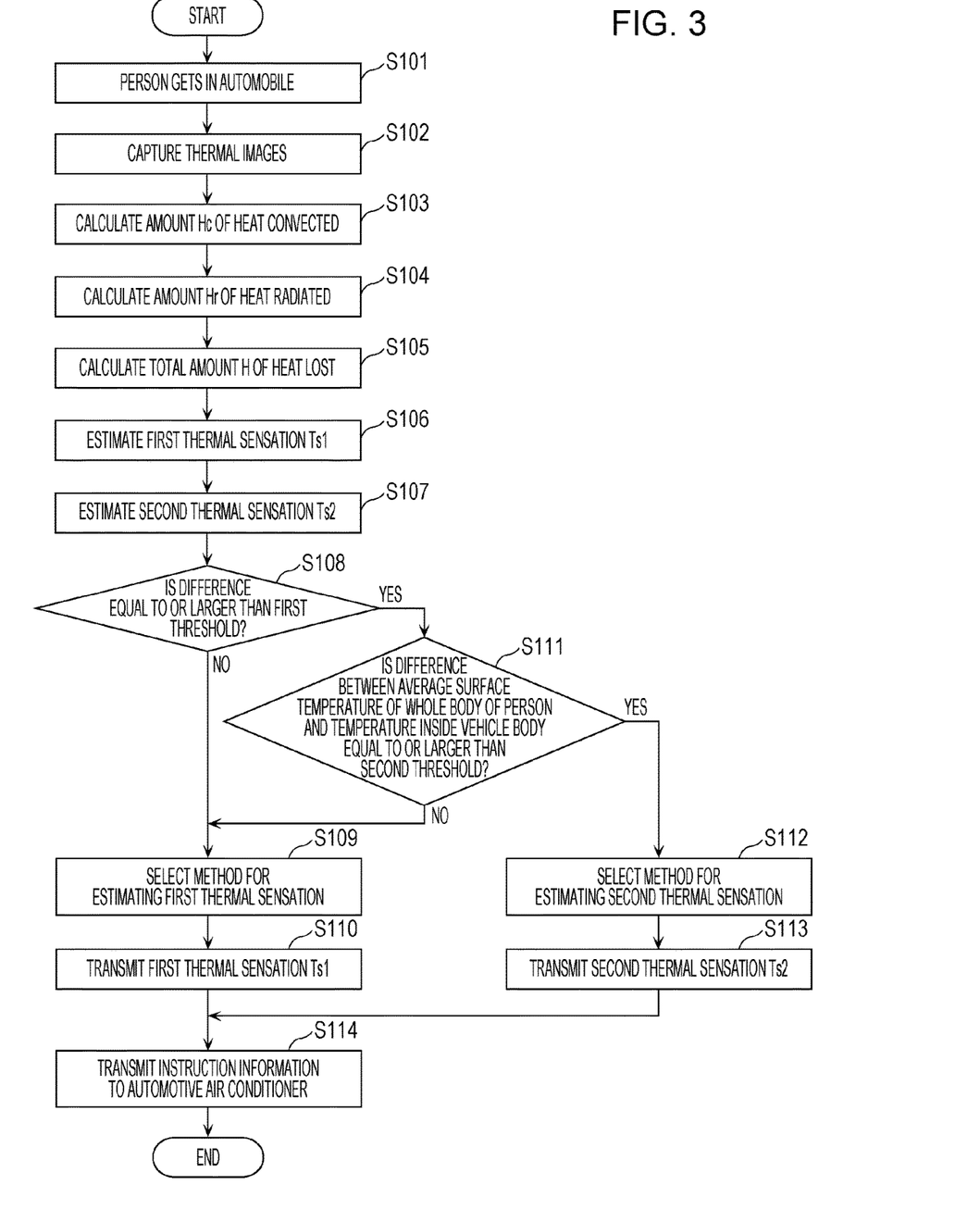
FIG. 3 is a flowchart illustrating a procedure of the operation of the thermal sensation estimation apparatus according to the first embodiment.

Next, the operation (the method for estimating thermal sensation) of the thermal sensation estimation apparatus 10 according to the first embodiment will be described with reference to FIG. 3. FIG. 3 is a flowchart illustrating a procedure of the operation of the thermal sensation estimation apparatus 10 according to the first embodiment.

As illustrated in FIG. 3, first, the person 30 gets in the automobile 20 (S101) and sits in the seat 202. The first thermal camera 101 and the second thermal camera 102 then capture thermal images of the whole body of the person 30 from the front (S102).

The heat loss calculation section 109 of the first thermal sensation estimation unit 103 then obtains an average surface temperature Tcl of the whole body of the person 30 on the basis of the thermal images captured in step S102. The heat loss calculation section 109 also obtains a temperature Ta inside the vehicle body 201 measured by the inside temperature sensor 105 installed in the vehicle body 201. The heat loss calculation section 109 then calculates an amount Hc of heat convected by multiplying a difference between the average surface temperature Tcl of the whole body of the person 30 and the temperature Ta by a convective heat transfer coefficient hc as in expression (1) (S103).

$$Hc = hc \times (Tcl - Ta) \quad (1)$$

Hc: Amount of heat convected
hc: Convective heat transfer coefficient
Ta: Temperature
Tcl: Average surface temperature of whole body of person The heat loss calculation section 109 also obtains an average radiation temperature Tr and an average surface temperature Tc of the whole body of the person 30 on the basis of the thermal images captured in step S102. The heat loss calculation section 109 then calculates an amount Hr of heat radiated by multiplying a difference between the average surface temperature Tc of the whole body of the person 30 and the average radiation temperature Tr by a radiative heat transfer coefficient hr as in expression (2) (S104).

$$Hr = hr \times (Tc - Tr) \quad (2)$$

Hr: Amount of heat radiated
hr: Radiative heat transfer coefficient
Tc: Average surface temperature of whole body of person
Tr: Average radiation temperature The heat loss calculation section 109 then adds the amount Hc of heat convected and the amount Hr of heat radiated as in expression (3). The heat loss calculation section 109 also calculates a total amount H of heat lost by multiplying a result of the addition by 1−Ws, which is a ratio (Wb/Wt) of an area Wb of an insulated part 301 of the person 30 (a part of the person 30 insulated by the seat 202) to an area Wt of the whole body of the person 30, as in expression (3) (S105).

$$H = (Hc + Hr) \times (1 - Ws) \quad (3)$$

H: Total amount of heat lost
Ws: Ratio of area of insulated part 301 to area of whole body The thermal sensation estimation section 110 of the first thermal sensation estimation unit 103 then estimates a first thermal sensation Ts1 on the basis of the total amount H of heat lost as in expression (4) (S106). The first thermal sensation Ts1 ranges, for example, from "−4" (cold) to "+4" (hot). A central value "0" (neutral) of the first thermal sensation Ts1 indicates a comfortable state.

$$Ts1 = a \times H + b \quad (4)$$

Ts1: First thermal sensation
a: Coefficient
b: Y-intercept

The second thermal sensation estimation unit 104 then obtains the average surface temperature Tcl of the whole body of the person 30 on the basis of the thermal images captured in step S102. The second thermal sensation estimation unit 104 estimates a second thermal sensation Ts2 on the basis of a difference between the average surface temperature Tcl and the sixth threshold (S107). As with the first thermal sensation Ts1, the second thermal sensation Ts2 ranges, for example, "−4" (cold) to "+4" (hot).

The thermal sensation estimation method determination unit 107 then obtains the temperature Ta inside the vehicle body 201 measured by the inside temperature sensor 105 installed in the vehicle body 201. The thermal sensation estimation method determination unit 107 also obtains a temperature Tb outside the vehicle body 201 measured by the outside temperature sensor 106 installed outside the vehicle body 201. The thermal sensation estimation method determination unit 107 determines whether a difference between the temperature Ta inside the vehicle body 201 and the temperature Tb outside the vehicle body 201 is equal to or larger than the first threshold (S108).

If the difference is smaller than the first threshold (NO in S108), the thermal sensation estimation method determination unit 107 selects the method for estimating the first thermal sensation (S109) and transmits the first thermal sensation Ts1 to the control unit 108 (S110), When the difference is smaller than the first threshold, it might be possible, for example, that the person 30 who had stayed outside in spring or autumn where temperature was 20° C. has entered the vehicle body 201 whose inside temperature is 20° C. and in which the automotive air conditioner 40 is not operating.

In step S108, if the difference is equal to or larger than the first threshold (YES in S108), the thermal sensation estimation method determination unit 107 determines whether a difference between the average surface temperature Tcl of the whole body of the person 30 and the temperature Ta inside the vehicle body 201 is equal to or larger than the second threshold (S111). If the difference between the average surface temperature Tcl and the temperature Ta inside the vehicle body 201 is smaller than the second threshold (NO in S111), the thermal sensation estimation method determination unit 107 selects the method for estimating the first thermal sensation (S109) and transmits the first thermal sensation Ts1 to the control unit 108 (S110). When the difference between the temperature Ta and the temperature Tb is equal to or larger than the first threshold and the difference between the average surface temperature Tcl and the temperature Ta inside the vehicle body 201 is smaller than the second threshold, it might be possible, for example, that the person 30 who had stayed outside in winter where temperature was 0° C. has entered the vehicle body 201 whose inside temperature is 20° C. and in which the automotive air conditioner 40 is performing a heating operation and the temperature of the surface of the clothes of the person 30 is about 20° C.

In step S111, if the difference between the average surface temperature Tcl and the temperature Ta inside the vehicle body 201 is equal to or larger than the second threshold (YES in S111), the thermal sensation estimation method determination unit 107 selects the method for estimating the second thermal sensation (S112) and transmits the second thermal sensation Ts2 to the control unit 108 (S113). When the difference between the temperature Ta and the temperature Tb is equal to or larger than the first threshold and the difference between the average surface temperature Tcl and the temperature Ta inside the vehicle body 201 is equal to or larger than the second threshold, it might be possible, for example, that the person 30 who had stayed outside in winter where temperature was 0° C. has entered the vehicle body 201 whose inside temperature is 20° C. and the temperature of the surface of the clothes of the person 30 is about 0° C.

The control unit 108 then transmits instruction information to the automotive air conditioner 40 on the basis of the first thermal sensation Ts1 or the second thermal sensation Ts2 (S114). As a result, at least one of air volume, air temperature, and wind direction of the automotive air conditioner 40 is controlled such that, for example, the first thermal sensation Ts1 or the second thermal sensation Ts2 becomes close to the value (neutral value) at which the person 30 does not feel cold or hot.

1-3. Advantageous Effects

As described above, when the temperature outside the vehicle body 201 is lower than the temperature inside the vehicle body 201 and the temperature inside the vehicle body 201 is higher than the temperature of the surface of the clothes of the person 30, for example, the amount of heat lost from the surface of the clothes is not equal to the amount of heat lost from the skin. In this case, the thermal sensation estimation method determination unit 107 selects the method for estimating the second thermal sensation based on the surface temperature of the person 30, not the method for estimating the first thermal sensation based on the amount of heat lost from the person 30. As a result, thermal sensation can be estimated with a certain accuracy even in an environment where it is difficult to accurately estimate the thermal sensation with the method for estimating the first thermal sensation.

In addition, since the thermal sensation estimation apparatus 10 is installed in the automobile 20, for example, the automotive air conditioner 40 can be controlled such that the thermal sensation becomes close to a value at which the person 30 does not feel cold or hot. As a result, the automotive air conditioner 40 does not cool or heat too much, and power is saved. The power that would otherwise be consumed by the automotive air conditioner 40, therefore, can be used to drive the automobile 20, and the automobile 20 can travel a longer distance.

Although a case in which the person 30 moves from a cold environment outside the vehicle body 201 into the warm vehicle body 201 has been described in the present embodiment, the above advantageous effects can also be produced when the person 30 moves from a hot environment outside the vehicle body 201 into the cool vehicle body 201.

In addition, although the second thermal sensation estimation unit 104 estimates the second thermal sensation using the average surface temperature of the whole body of the person 30, the method for estimating the second thermal sensation is not limited to this. For example, the second thermal sensation may be estimated using an average surface temperature of feet 302 or hands 303 of the person 30, instead. Because, when the person 30 feels cold, blood vessels in the hands 303 and the feet 302 of the person 30 contract to reduce loss of heat, an average surface temperature of the periphery is more correlated with thermal sensation than the average surface temperature of the whole body is. In this case, it is desirable to directly measure the skin temperature of the periphery, but if the skin and the clothes are in direct contact, the temperature of the surface of the clothes may be measured, instead. Because the skin temperature of a face is relatively well correlated with thermal sensation, the second thermal sensation may be estimated using an average surface temperature of the face of the person 30, instead.

In addition, although the thermal sensation estimation method determination unit 107 determines in step S111 whether the difference between the average surface temperature Tcl of the whole body of the person 30 and the temperature Ta inside the vehicle body 201 is equal to or larger than the second threshold in the present embodiment, the processing performed by the thermal sensation estimation method determination unit 107 is not limited to this. If the difference is equal to or larger than the first threshold, the thermal sensation estimation method determination unit 107 may, instead of performing step S111, select the method for estimating the second thermal sensation until a certain period of time elapses after the person 30 enters the vehicle body 201 and then select the method for estimating the first thermal sensation when the certain period of time elapses. This is because the temperature of the surface of the clothes remains about 0° C. until the certain period of time elapses after the person 30 who has stayed outside where temperature is 0° C. enters a vehicle whose inside temperature is 20° C., for example, and the amount of heat lost from the surface of the clothes is different from the amount of heat lost from the skin.

Second Embodiment 2-1. Configuration of Thermal Sensation Estimation Apparatus

Figure 4:
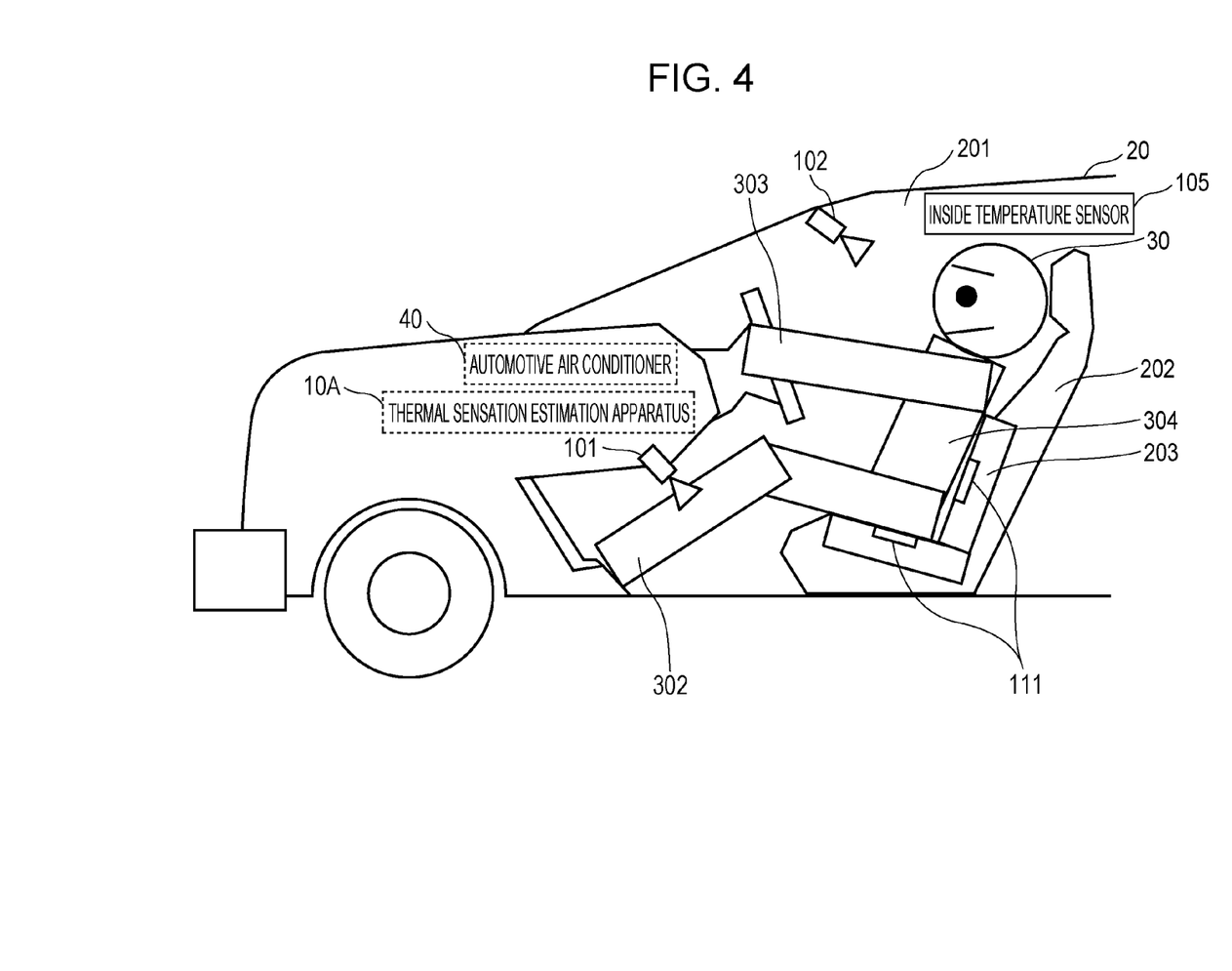
FIG. 4 is a diagram illustrating a use case of a thermal sensation estimation apparatus according to a second embodiment.
Figure 5:
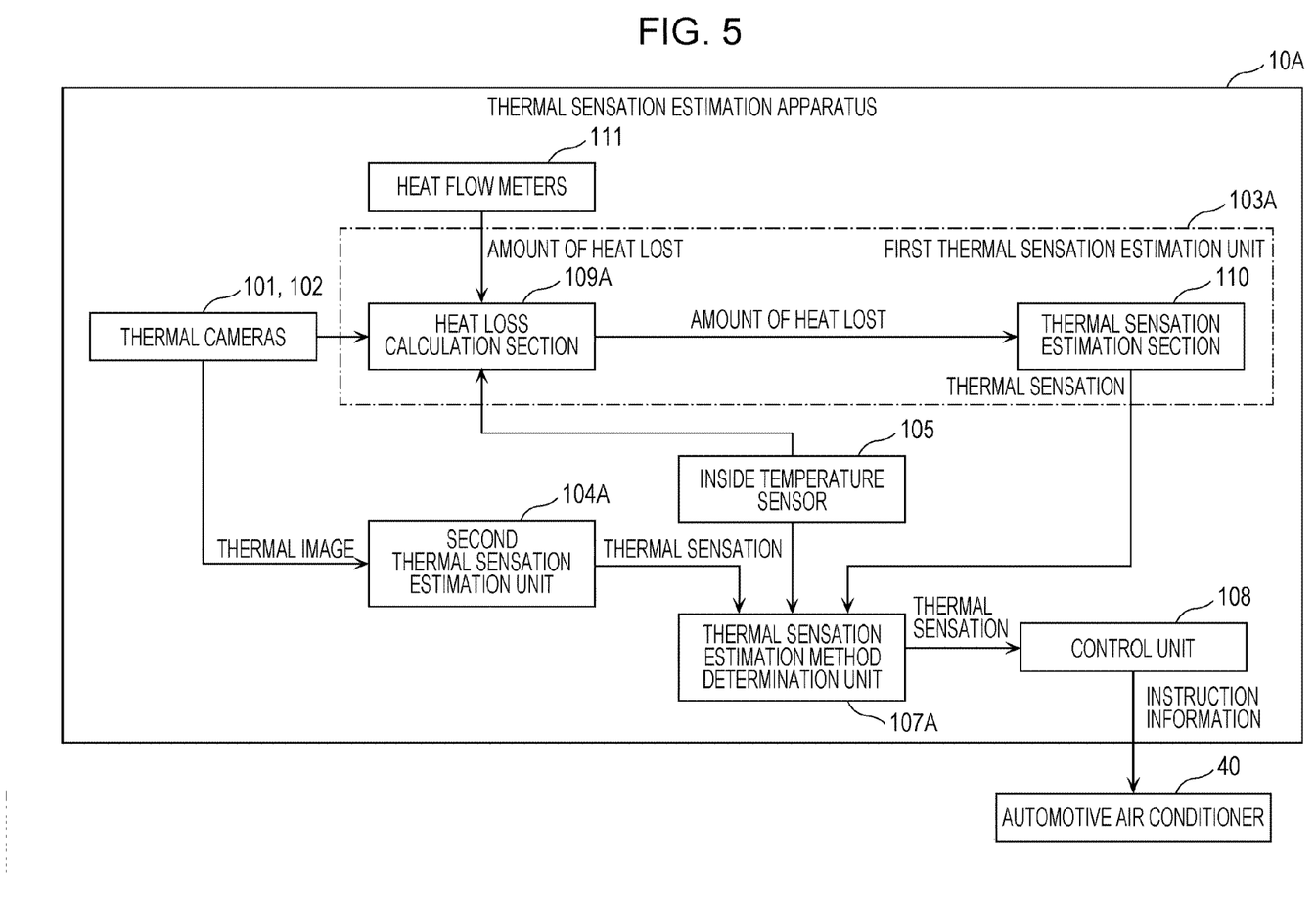
FIG. 5 is a block diagram illustrating the configuration of the thermal sensation estimation apparatus according to the second embodiment.

Next, the configuration of a thermal sensation estimation apparatus 10A according to a second embodiment will be described with reference to FIGS. 4 and 5. FIG. 4 is a diagram illustrating a use case of the thermal sensation estimation apparatus 10A according to the second embodiment. FIG. 5 is a block diagram illustrating the configuration of the thermal sensation estimation apparatus 10A according to the second embodiment. In the present embodiment, the same components as those according to the first embodiment are given the same reference numerals, and description thereof is omitted.

In the present embodiment, a case will be described in which the automotive air conditioner 40 performs a heating operation in winter. As illustrated in FIG. 4, seat heaters 203 for heating a back of the person 30 are installed in the seat 202 of the automobile 20.

As illustrated in FIGS. 4 and 5, the thermal sensation estimation apparatus 10A includes heat flow meters 111 in addition to the components described in the first embodiment. As illustrated in FIG. 4, the heat flow meters 111 are mounted on the seat heaters 203 and measure the amount of heat transferred from the seat heaters 203 to the person 30. Alternatively, thermometers, for example, may be mounted on the seat heaters 203 instead of the heat flow meters 111, and the amount of heat transferred may be estimated on the basis of temperatures measured by the thermometers. Alternatively, the heat flow meters 111 may be omitted, and the amount of heat transferred may be estimated on the basis of power (current), for example, supplied to the seat heaters 203.

A heat conduction calculation section 109A of a first thermal sensation estimation unit 103A calculates the amount of heat conducted in a seat part 304, in which the person 30 is in contact with the seat heaters 203, of the human body area. More specifically, the heat conduction calculation section 109A calculates a reciprocal of the amount of heat transferred from the seat heaters 203 to the person 30 measured by the heat flow meters 111 as the amount of heat conducted in the seat part 304.

A second thermal sensation estimation unit 104A estimates the second thermal sensation using an average surface temperature of the feet 302 of the person 30. More specifically, the second thermal sensation estimation unit 104A compares the average surface temperature of the feet 302 with a threshold. If the average surface temperature of the feet 302 is lower than the threshold, the second thermal sensation estimation unit 104A estimates that the person 30 is feeling relatively cold, and if the average surface temperature of the feet 302 is equal to or higher than the threshold, the second thermal sensation estimation unit 104A estimates that the person 30 is feeling relatively warm. The average surface temperature of the feet 302 is obtained from thermal images captured by the first thermal camera 101 and the second thermal camera 102.

As a method for estimating thermal sensation to be used, a thermal sensation estimation method determination unit 107A selects either (1) the method for estimating the first thermal sensation or (2) the method for estimating the second thermal sensation on the basis of a result of the comparison between the average surface temperature of the feet 302 of the person 30 (an example of thermal environment information regarding a thermal environment of a person) and a third threshold. More specifically, if the average surface temperature of the feet 302 is equal to or higher than the third threshold, the thermal sensation estimation method determination unit 107A selects the method for estimating the first thermal sensation. If the average surface temperature of the feet 302 is lower than the third threshold, on the other hand, the thermal sensation estimation method determination unit 107 selects the method for estimating the second thermal estimation. The average surface temperature of the feet 302 is obtained from thermal images captured by the first thermal camera 101 and the second thermal camera 102.

Figure 6A:
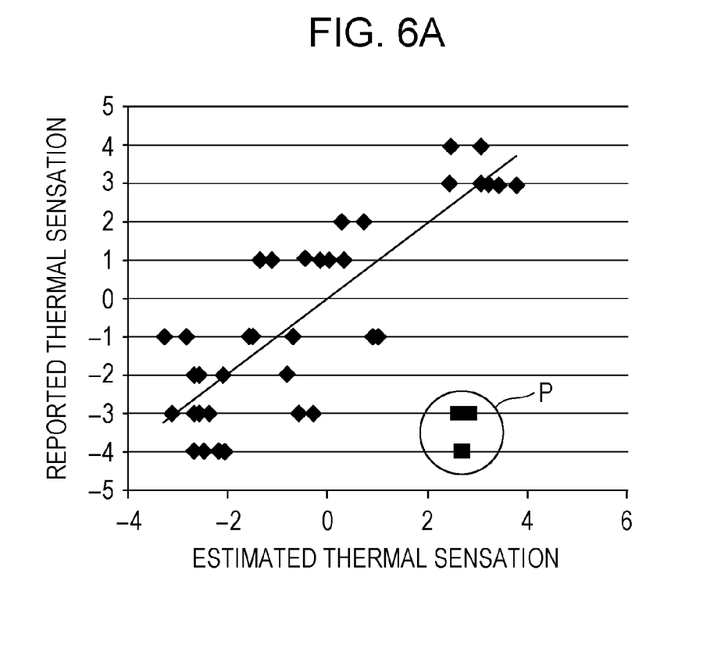
FIG. 6A is a graph illustrating a relationship between thermal sensation estimated on the basis of the amount of heat transferred to a whole body of a subject and thermal sensation reported by the subject.
Figure 6B:
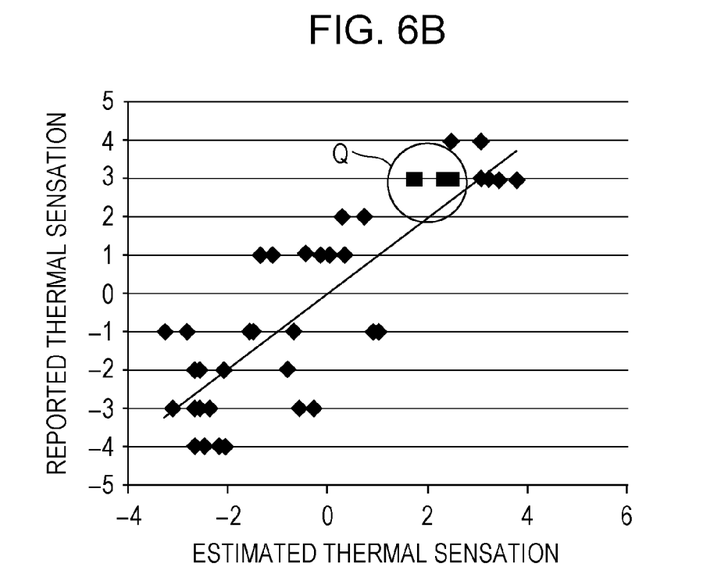
FIG. 6B is a graph illustrating a relationship between thermal sensation estimated on the basis of the amount of heat transferred to the whole body of the subject and thermal sensation reported by the subject.

A criterion used by the thermal sensation estimation method determination unit 107A to select the method for estimating thermal sensation will be described with reference to FIGS. 6A and 6B. FIGS. 6A and 6B are graphs illustrating relationships between thermal sensation estimated on the basis of the amount of heat transferred to a whole body of a subject and thermal sensation reported by the subject. Dots in a circle P in FIG. 6A are results at a time when the subject's feet are cold. Dots in a circle Q in FIG. 6B are results at a time when the subject's feet are heated by a foot warmer.

Solid lines in FIGS. 6A and 6B indicate an ideal correlation between the estimated thermal sensation and the reported thermal sensation, which is a high correlation. As can be seen from the results in the circle P in FIG. 6A, when the subject's feet are fairly cold, the subject tends to feel cold regardless of the amount of heat transferred (the amount of heat received). On the other hand, as can be seen from the results in the circle Q in FIG. 6B, after the subject's feet are heated by the foot warmer, the reported thermal sensation is well correlated with the amount of heat transferred (the amount of heat received). That is, when someone's feet are cold, an error in the estimation of thermal sensation becomes large in the case of the method for estimating the first thermal sensation, and an actual thermal sensation is reflected more accurately if the method for estimating the second thermal sensation is used.

2-2. Operation of Thermal Sensation Estimation Apparatus

Figure 7:
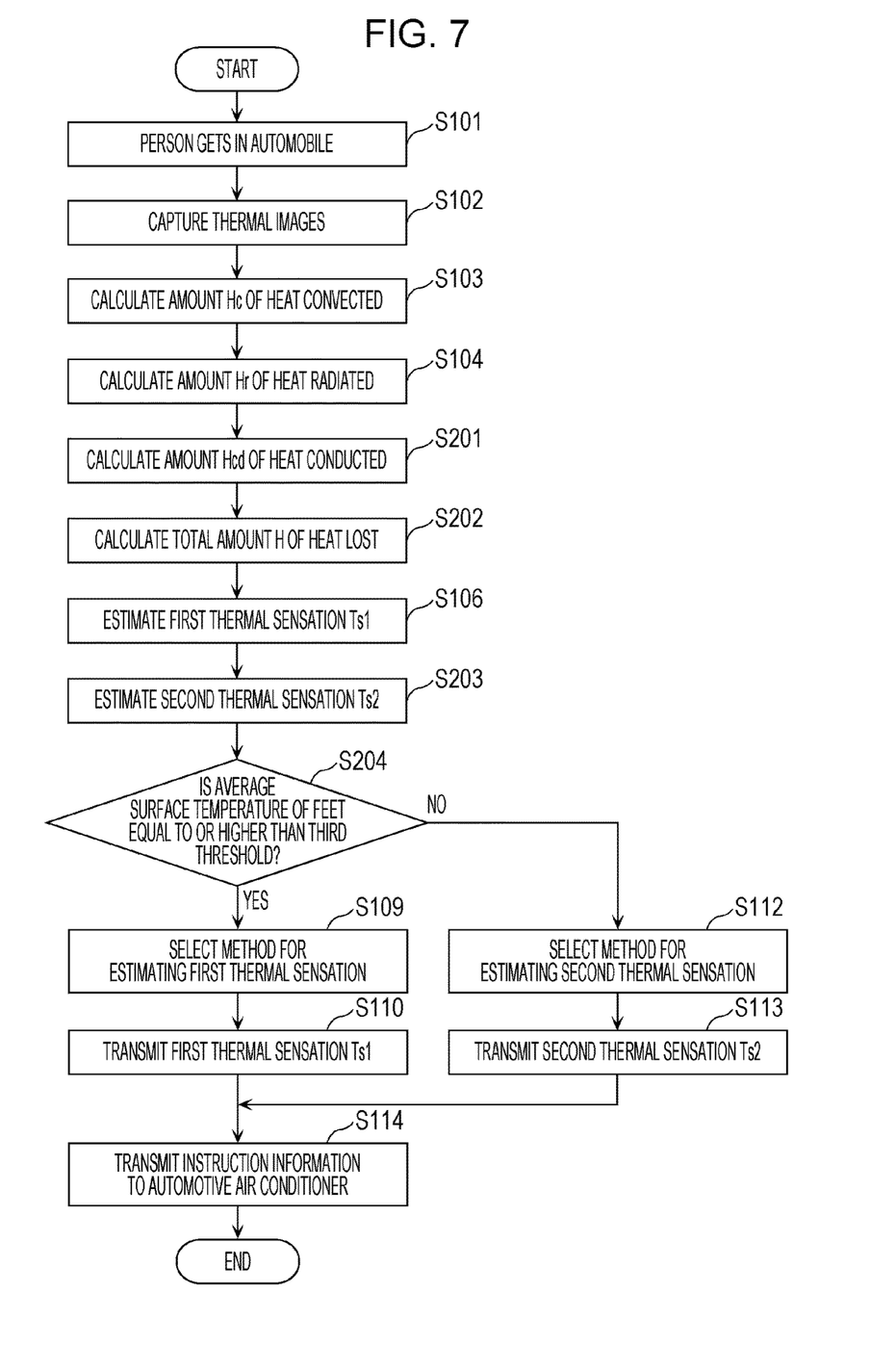
FIG. 7 is a flowchart illustrating a procedure of the operation of the thermal sensation estimation apparatus according to the second embodiment.

Next, the operation (the method for estimating thermal sensation) of the thermal sensation estimation apparatus 10A according to the second embodiment will be described with reference to FIG. 7. FIG. 7 is a flowchart illustrating a procedure of the operation of the thermal sensation estimation apparatus 10A according to the second embodiment. In FIG. 7, the same steps as those according to the first embodiment illustrated in FIG. 3 are given the same reference numerals, and description thereof is omitted.

First, as in the first embodiment, steps S101 to S104 are performed. The heat conduction calculation section 109A of the first thermal sensation estimation unit 103A then calculates the reciprocal of the amount of heat transferred from the seat heaters 203 to the person 30 measured by the heat flow meters 111 as an amount Hcd of heat conducted in the seat part 304 (S201). The seat part 304 is a part of the human body area in which the person 30 is in contact with the seat heaters 203.

The heat conduction calculation section 109A then calculates the total amount H of heat lost by weight-averaging the amount Hc of heat convected, the amount Hr of heat radiated, and the amount Hcd of heat conducted with an area ratio Wst as in expression (5) (S202).

$$H=(Hc+Hr)\times(1-Wst)+Wst\times Hcd \quad (5)$$

H: Total amount of heat lost
Wst: Ratio of area of seat part 304 to area of whole body
Hcd: Amount of heat conducted As the first embodiment, step S106 is then performed. The second thermal sensation estimation unit 104A then estimates the second thermal sensation Ts2 on the basis of an average surface temperature Tft of the feet 302 obtained from the thermal images captured in step S102 (S203).

The thermal sensation estimation method determination unit 107A then determines whether the average surface temperature Tft of the feet 302 is equal to or higher than the third threshold (S204). If the average surface temperature Tft of the feet 302 is equal to or higher than the third threshold (YES in S204), the thermal sensation estimation method determination unit 107A selects the method for estimating the first thermal estimation (S109) and transmits the first thermal sensation Ts1 to the control unit 108 (S110). When the average surface temperature Tft of the feet 302 is equal to or higher than the third threshold, it might be possible, for example, that the automotive air conditioner 40 is performing a heating operation in winter and the person 30 is heating his/her feet 302 with a foot warmer.

In step S204, if the average surface temperature Tft of the feet 302 is lower than the third threshold (NO in S204), the thermal sensation estimation method determination unit 107A selects the method for estimating the second thermal sensation (S112) and transmits the second thermal sensation Ts2 to the control unit 108 (S113). When the average surface temperature Tft of the feet 302 is lower than the third threshold, it might be possible, for example, that the automotive air conditioner 40 is performing a heating operation in winter but the feet 302 of the person 30 are cold.

As in the first embodiment, step S114 is then performed.

2-3. Advantageous Effects

As described above, when the person 30 is feeling cold in winter regardless of the amount of heat transferred (the amount of heat received) to the person 30 because the feet 302 of the person 30 are cold, for example, the thermal sensation estimation apparatus 10A according to the present embodiment estimates the second thermal sensation using the method for estimating the second thermal sensation based on the average surface temperature of the feet 302. As a result, thermal sensation can be accurately estimated even when thermal sensation according to the amount of heat transferred is not obtained.

The same advantageous effects can also be produced, for example, when the person 30 is not feeling cool in summer regardless of the amount of heat lost from the person 30 because the feet 302 of the person 30 are hot.

Although the thermal sensation estimation method determination unit 107A selects the method for estimating thermal sensation to be used on the basis of a result of a comparison between the average surface temperature of the feet 302 of the person 30 and the third threshold in the present embodiment, the thermal sensation estimation method determination unit 107A may select the method for estimating thermal sensation to be used on the basis of a result of a comparison between a temperature (an example of thermal environment information regarding a thermal environment around a person) around the feet 302 of the person 30 and a fourth threshold, instead. In this case, if the temperature around the feet 302 is equal to or higher than the fourth threshold, the thermal sensation estimation method determination unit 107A selects the method for estimating the first thermal sensation. If the temperature around the feet 302 is lower than the fourth threshold, on the other hand, the thermal sensation estimation method determination unit 107A selects the method for estimating the second thermal sensation.

Furthermore, the thermal sensation estimation method determination unit 107A may select the method for estimating thermal sensation to be used on the basis of a result of a comparison between an average surface temperature (an example of thermal environment information regarding a thermal environment of a person) of the hands 303 of the person 30 and a fifth threshold, instead. In this case, if the average surface temperature of the hands 303 is equal to or higher than the fifth threshold, the thermal sensation estimation method determination unit 107A selects the method for estimating the first thermal sensation. If the average surface temperature of the hands 303 is lower than the fifth threshold, on the other hand, the thermal sensation estimation method determination unit 107A selects the method for estimating the second thermal sensation.

Modifications

Although the method for estimating thermal sensation and the like according to one or a plurality of aspects have been described on the basis of the first and second embodiments, the present disclosure is not limited to the first and second embodiments. The one or plurality of aspects may also include modes obtained by modifying the first or second embodiment in various ways conceivable by those skilled in the art and modes constructed by combining different components in the first and second embodiments insofar as the scope of the present disclosure is not deviated from. For example, the first and second embodiments may be combined with each other.

Although the thermal sensation estimation method determination unit 107 (107A) selects either (1) the method for estimating the first thermal sensation or (2) the method for estimating the second thermal sensation as the method for estimating thermal sensation to be used on the basis thermal environment information in the above embodiments, for example, the method used is not limited to these. The thermal sensation estimation method determination unit 107 (107A) may select (1) the method for estimating the first thermal sensation, (2) the method for estimating the second thermal sensation, or (3) both the method for estimating the first thermal sensation and the method for estimating the second thermal sensation as the method(s) for estimating thermal sensation to be used on the basis of thermal environment information, instead. If the thermal sensation estimation method determination unit 107 (107A) has selected both the method for estimating the first thermal sensation and the method for estimating the second thermal sensation, the thermal sensation estimation method determination unit 107 (107A) estimates thermal sensation by, for example, weight-averaging a result of the estimation of thermal sensation by the method for estimating the first thermal sensation and a result of the estimation of thermal sensation by the method for estimating the second thermal sensation using a certain value. For example, two thresholds of A°C and B°C (A<B) are used in order to determine a surface temperature C of feet. If the surface temperature C of the feet is lower than A°C, the result Ts2 of the estimation of the second thermal sensation is selected. If the surface temperature C of the feet is higher than B°C, on the other hand, a result Ts1 of the estimation of the first thermal sensation is selected. If the surface temperature C of the feet falls between A°C and B°C, a weighted average of the result Ts1 of the estimation of the first thermal sensation and the result Ts2 of the estimation of the second thermal sensation represented by expression (6) is used as a result of estimation of thermal sensation.

$$(Ts1\times(B-C)+Ts2\times(C-A))/(B-A) \quad (6)$$

Although the air conditioner is the automotive air conditioner 40 in the above embodiments, for example, the air conditioner may be a spot air conditioner installed in a room, instead.

Although the vehicle is the automobile 20 in the above embodiments, for example, the vehicle may be a train, an airplane, or the like, instead.

Although the thermal sensation estimation apparatus 10 (10A) is installed in the automobile 20 in the above embodiments, for example, the thermal sensation estimation apparatus 10 (10A) may be installed in a room of a house, instead.

Some or all of the components of the apparatuses may be achieved by an integrated circuit (IC) card or a separate module removably attached to the apparatuses. The IC card or the module is a computer system including a microprocessor, a read-only memory (ROM), and a random-access memory (RAM). The IC card or the module may include a super-multifunctional large-scale integration (LSI) circuit. When the microprocessor operates in accordance with a computer program, the IC card or the module achieves functions thereof. The IC card or the module may be tamper-resistant.

The present disclosure may be the above-described methods. The present disclosure may be a computer program that achieves these methods using a computer, or may be a digital signal including the computer program. The present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory. The present disclosure may be the digital signal stored in the recording medium. The present disclosure may be the computer program or the digital signal transferred through an electrical communication line, a wireless or wired communication line, a network typified by the Internet, datacasting, or the like. The present disclosure may be a computer system including a microprocessor and a memory. The memory may store the computer program, and the microprocessor may operate in accordance with the computer program. The present disclosure may be implemented by another independent computer system by transferring the program or the digital signal stored in the recording medium or by transferring the program or the digital signal through the network or the like.

The present disclosure can be used, for example, for a method for estimating thermal sensation.

What is claimed is:

1. A method used by a thermal sensation estimation apparatus, the method comprising:
   obtaining thermal environment information at least regarding a thermal environment of or around a person;
   estimating a first thermal sensation using a first method on the basis of the thermal environment information, wherein the first thermal sensation indicates a first degree of warmth or coldness of the person;
   estimating a second thermal sensation using a second method on the basis of the thermal environment information, wherein the second thermal sensation indicates a second degree of warmth or coldness of the person and wherein the second method is a method different from the first method;
   selecting at least one of the first thermal sensation estimated using the first method and the second thermal sensation estimated using the second method on the basis of the thermal environment information; and
   outputting, to a device connected to the thermal sensation estimation apparatus, instruction information using the selected at least one of the first thermal sensation estimated using the first method and the second thermal sensation estimated using the second method,
   wherein the instruction information is information for controlling the device.

2. The method according to claim 1,
   wherein the first method is a method for estimating, as the first thermal sensation indicating the first degree, thermal sensation based on an amount of heat lost from the person, and
   wherein the second method is a method for estimating, as the second thermal sensation indicating the second degree, thermal sensation based on a surface temperature of the person.

3. The method according to claim 2,
   wherein the thermal environment information is a difference between a temperature outside a room in which the person stays and a temperature inside the room.

4. The method according to claim 3, further comprising:
   determining whether the difference is equal to or larger than a first threshold; and
   determining whether a certain period of time elapses after the person enters the room, if it is determined that the difference is equal to or larger than the first threshold,
   wherein, if it is determined that the difference is equal to or larger than the first threshold and that the certain period of time does not elapse, the second thermal sensation estimated using the second method is selected as the at least one of the first thermal sensation estimated using the first method and the second thermal sensation estimated using the second method in the selecting, and
   wherein, if it is determined that the difference is equal to or larger than the first threshold and that the certain period of time elapses, the first thermal sensation estimated using the first method is selected as the at least one of the first thermal sensation estimated using the first method and the second thermal sensation estimated using the second method in the selecting.

5. The method according to claim 3, further comprising:
   determining whether the difference is equal to or larger than a first threshold;
   further determining, if it is determined that the difference is equal to or larger than the first threshold, whether a difference between the surface temperature of the person and the temperature inside the room is equal to or larger than a second threshold,
   wherein, if it is determined that the difference between the surface temperature of the person and the temperature inside the room is equal to or larger than the second threshold, the second thermal sensation estimated using the second method is selected as the at least one of the first thermal sensation estimated using the first method and the second thermal sensation estimated using the second method in the selecting, and, and
   wherein, if it is determined that the difference between the surface temperature of the person and the temperature inside the room is smaller than the second threshold, the first thermal sensation estimated using the first method is selected as the at least one of the first thermal sensation estimated using the first method and the second thermal sensation estimated using the second method in the selecting.

6. The method according to claim 2,
   wherein the thermal environment information is a surface temperature of the person's feet,
   wherein the method further comprises
   determining whether the surface temperature of the person's feet is equal to or higher than a third threshold,
   wherein, if it is determined that the surface temperature of the person's feet is equal to or higher than the third threshold, the first thermal sensation estimated using the first method is selected as the at least one of the first thermal sensation estimated using the first method and the second thermal sensation estimated using the second method in the selecting, and
   wherein, if it is determined that the surface temperature of the person's feet is lower than the third threshold, the second thermal sensation estimated using the second method is selected as the at least one of the first thermal sensation estimated using the first method and the second thermal sensation estimated using the second method in the selecting.

7. The method according to claim 2,
   wherein the thermal environment information is a temperature around the person's feet, and
   wherein the method is further comprises,
   determining whether the temperature around the person's feet is equal to or higher than a fourth threshold,
   wherein, if it is determined that the temperature around the person's feet is equal to or higher than the fourth threshold, the first thermal sensation estimated using the first method is selected as the at least one of the first thermal sensation estimated using the first method and the second thermal sensation estimated using the second method in the selecting, and
   wherein, if it is determined that the temperature around the person's feet is lower than the fourth threshold, the second thermal sensation estimated using the second method is selected as the at least one of the first thermal sensation estimated using the first method and the second thermal sensation estimated using the second method in the selecting.

8. The method according to claim 2,
   wherein the thermal environment information is a surface temperature of the person's hands, and
   wherein the method further comprises,
   determining whether the surface temperature of the person's hands is equal to or higher than a fifth threshold,
   wherein, if it is determined that the surface temperature of the person's hands is equal to or higher than the fifth threshold, the first thermal sensation estimated using the first method is selected as the at least one of the first thermal sensation estimated using the first method and the second thermal sensation estimated using the second method in the selecting, and wherein, if the surface temperature of the person's hands is lower than the fifth threshold, the second thermal sensation estimated using the second method is selected as the at least one of the first thermal sensation estimated using the first method and the second thermal sensation estimated using the second method in the selecting.

9. The method according to claim 2,
wherein the estimating of the first thermal sensation is performed by calculating a difference between a surface temperature of a human body area, which at least includes a part of the person's body exposed and a part of the person's clothes, and a temperature around the person, calculating an amount of heat lost from the person by multiplying the difference by a certain value, and estimating the first thermal sensation on the basis of the amount of heat lost from the person.

10. The method according to claim 9,
wherein the surface temperature of the human body area is calculated using a thermal image of an area including the person captured by a thermal camera.

11. The method according to claim 2,
wherein the estimating of the second thermal sensation is performed by obtaining a surface temperature of a human body area, which at least includes a part of the person's body exposed and a part of the person's clothes, and estimating the second thermal sensation on the basis of a result of a comparison between the surface temperature of the human body area and a sixth threshold.

12. The method according to claim 11,
wherein the surface temperature of the human body area is calculated using a thermal image of an area including the person captured by a thermal camera.

13. The method according to claim 1,
wherein the person is inside a vehicle, and the thermal environment around the person is at least either an outside or an inside of the vehicle.

14. The method according to claim 1, further comprises if both of the first thermal sensation estimated using the first method and the second thermal sensation estimated using the second method are selected as the at least one of the first thermal sensation estimated using the first method and the second thermal sensation estimated using the second method in the selecting, weight-averaging the selected first thermal sensation and the selected second thermal sensation using a certain value.

15. The method according to claim 1,
wherein the device is air conditioner,
wherein the instruction information for controlling air volume, air temperature, or wind direction of an air conditioner is output to the air conditioner on the basis of the selected at least one of the first thermal sensation and the second thermal sensation.

16. A thermal sensation estimation apparatus comprising:
a processor; and
a memory that stores a computer program,
wherein the program causes the processor to perform operations including:
obtaining thermal environment information at least regarding a thermal environment of or around a person;
estimating a first thermal sensation using a first method on the basis of the thermal environment information, wherein the first thermal sensation indicates a first degree of warmth or coldness of the person;
estimating a second thermal sensation using a second method on the basis of the thermal environment information, wherein the second thermal sensation indicates a second degree of warmth or coldness of the person and wherein the second method is a method different from the first method;
selecting at least one of the first thermal sensation estimated using the first method and the second thermal sensation estimated using the second method on the basis of the thermal environment information; and
outputting, to a device connected to the thermal sensation estimation apparatus, instruction information using the selected at least one of the first thermal sensation estimated using the first method and the second thermal sensation estimated using the second method,
wherein the instruction information is information for controlling the device.

17. An air conditioner comprising:
a thermal sensation estimation apparatus; and
a controller that controls air volume, air temperature, or wind direction,
wherein, the thermal sensation estimation apparatus further includes:
a processor; and
a memory that stores a computer program,
wherein the program causes the processor to perform operations including:
obtaining thermal environment information at least regarding a thermal environment of or around a person;
estimating a first thermal sensation using a first method on the basis of the thermal environment information, wherein the first thermal sensation indicates a first degree of warmth or coldness of the person;
estimating a second thermal sensation using a second method on the basis of the thermal environment information, wherein the second thermal sensation indicates a second degree of warmth or coldness of the person and wherein the second method is a method different from the first method;
selecting at least one of the first thermal sensation estimated using the first method and the second thermal sensation estimated using the second method, on the basis of the thermal environment information; and
outputting, to the controller, instruction information using the selected at least one of the first thermal sensation estimated using the first method and the second thermal sensation estimated using the second method, wherein the instruction information is information for controlling the controller,
wherein the air volume, the air temperature, or the wind direction is controlled by the controller on the basis of the instruction information.

18. A non-transitory recording medium storing a program for causing a computer to function as a thermal sensation estimation apparatus, the program causing the computer to perform operations comprising:
obtaining thermal environment information at least regarding a thermal environment of or around a person;
estimating a first thermal sensation using a first method on the basis of the thermal environment information, wherein the first thermal sensation indicates a first degree of warmth or coldness of the person;
estimating a second thermal sensation using a second method on the basis of the thermal environment information, wherein the second thermal sensation indicates a second degree of warmth or coldness of the person and wherein the second method is a method different from the first method;

selecting at least one of the first thermal sensation estimated using the first method and the second thermal sensation estimated using the second method on the basis of the thermal environment information; and outputting, to a device connected to the computer, instruction information using the selected at least one of the first thermal sensation estimated using the first method and the second thermal sensation estimated using the second method, wherein the instruction information is information for controlling the device.

19. The method according to claim 1, wherein the obtaining of the thermal environment information uses a first camera directed at a first portion of the person and a second camera directed at a second portion of the person, and a heat flow meter.

20. The method according to claim 19, wherein the heat flow meter is in contact with the person.

* * * * *